Oct. 23, 1923. Re. 15,704

J. S. REYNOLDS

AUTOMATIC ROAD AND SURFACE SCRAPER

Original Filed Jan. 20, 1920

Inventor:
J. S. Reynolds, by

C. A. Mason, Att'y.

Reissued Oct. 23, 1923. Re. 15,704

UNITED STATES PATENT OFFICE.

JOSEPH S. REYNOLDS, OF SANTA BARBARA, CALIFORNIA.

AUTOMATIC ROAD AND SURFACE SCRAPER.

Original No. 1,368,838, dated February 15, 1921, Serial No. 352,902, filed January 20, 1920. Application for reissue filed August 13, 1923. Serial No. 657,263.

*To all whom it may concern:*

Be it known that I, JOSEPH S. REYNOLDS, a citizen of the United States of America, residing at Santa Barbara, in the county of Santa Barbara and State of California, have invented new and useful Improvements in Automatic Road and Surface Scrapers, of which the following is a specification.

This invention relates to earth working elements such as scrapers, and particularly shovel scrapers, and has for its object to provide an improved combination of tractor and scraper with means for locking the tractor and scraper in operative scraping relation and readily operative to release the scraping shovel from a locked position to permit it to be dumped and to provide means for automatically relocking the scraper in a given scraping position when the tractor is backed toward the scraper. The invention consists of the construction, the combination and in details and arrangements of parts an embodiment of which is illustrated in the accompanying drawings and described and claimed herein.

Figure 1:
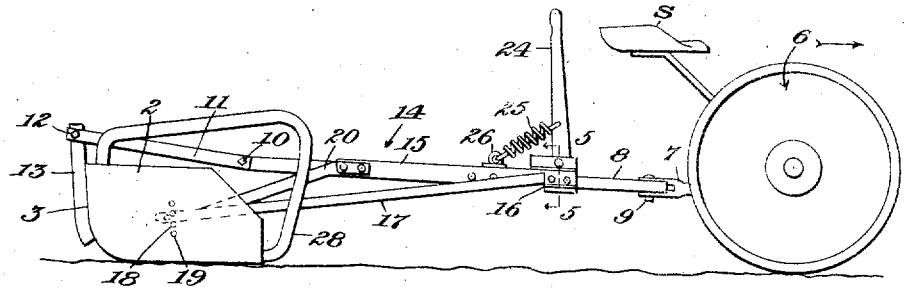
Fig. 1 is a side elevation of the improved combination showing a part of the tractor with the scraper in operative scraping position.
Figure 2:
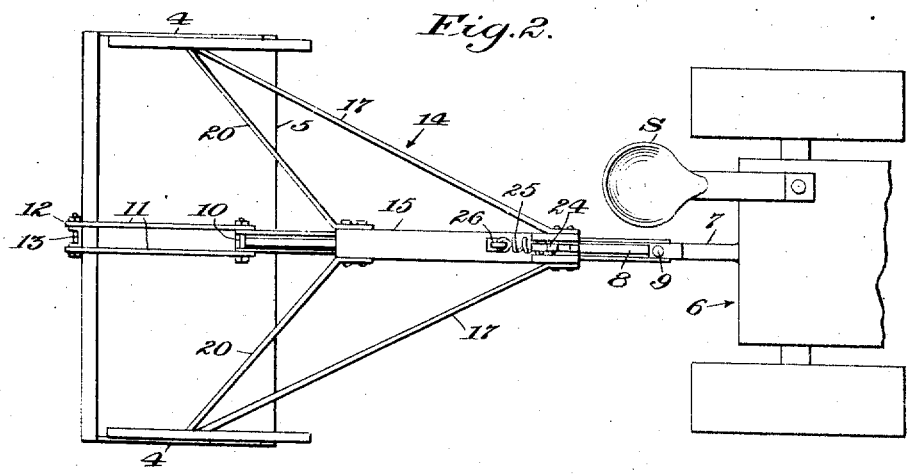
Fig. 2 is a plan view of the structure of Fig. 1.

The present invention contemplates the combination of an earth working element, which in the present instance is shown as a scraper of a type indicated at 2 having a scoop or shovel-like body with a flat bottom having an upwardly extending back portion 3 and parallel side portions 4—4, the transverse front edge of the bottom of the scraper forming a cutting means indicated at 5 although a removable or renewable scraper blade or knife may be provided if desired, and attaching thereto a suitable draft means as a tractor 6 and providing connecting means whereby the setting of the scraper in operative scraping position and the dumping of the same and the resetting of the same may all be readily accomplished by the movement of the tractor, the locking and releasing being controlled at will by the operator of the outfit.

In this case a draw bar connects the scoop to the draft member 7 of the tractor. This draw bar consists of a front or leading member or link 8 pivoted at 9 to the draft member 7. The rear end of the link 8 is pivoted at 10 to a link or pair of links 11 extending rearwardly and connected at 12 to the upwardly extending portion of a bracket 13 which is in this case attached to the middle of the back 3 of the scoop.

Slidably mounted on the main link 8 of the draft device there is a frame 14 that may comprise an inverted channel iron 15 straddling the link 8 and suitably secured thereon by a transverse cleat or bar 16 to prevent the member 15 from vertical movement, and from the forward end of the sliding member 15 there extend rearwardly and outwardly braces 17 on each side, the rearmost ends of which are connected to respective pivots 18 that may be mounted on one or another of a series of apertures 19 in each of the side walls 4 of the scraper body. The frame 14 further consists of a rear set of diagonal braces 20 converging toward and also arranged on the respective pivots 18, the rear ends of the braces 17 and 20 on each side overlapping and, if desired, being rigidly connected together to form a bodily removable and rigid frame.

For the purpose of locking the scraper 2 with its bottom in any suitable angular position with respect to the draft link 8 and so as to vary its cutting angle or scraping angle with respect to the surface over which it is drawn, the sliding frame is adapted to be locked to the link 8 at several positions by suitable means, here shown as comprising a latch or pawl 21, the forward and upper end of which is pivoted at 22 in suitable bearings 23 provided on the sliding member 15 of the frame 14, the web of the sliding member being slotted as at 15′ to permit the up and down play of the latch or pawl 21.

Figure 4:
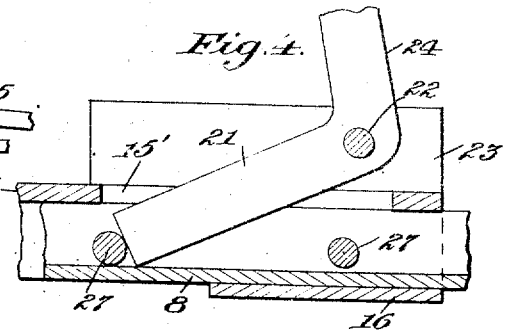
Fig. 4 is a detail sectional view of a form of locking means to connect the scraper body to various angles to the draft beam of the tractor.
Figure 5:
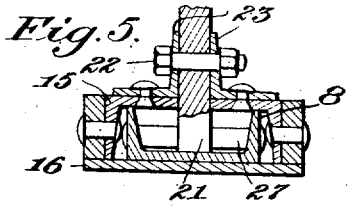
Fig. 5 is a cross section on line 5—5 of Fig. 1.

The latch 21 may be formed as a part of a lever 24 which extends upwardly from the pivot 22 to within convenient reach of the operator of the tractor from a position at the seat S of the tractor. The latch 21 is normally drawn downwardly through the slot 15′ as by a spring 25 one end of which is connected to the lever 24 and the other to a suitable fixed part as an eye 26 on the top of the slide member 15. The lower end of the latch 21 is designed to engage with one or another of a series of transverse shoulders such as pins 27 a suitable number of which are arranged, in this case, at appropriate spaces in the main draft link 8 which may be made of channel iron as shown in Figs. 4 and 5 with the flanges turned upwardly, this channel iron being straddled by the inverted channel iron or link member 15.

The operation of the device as above described is as follows:

With the tractor moving in the direction of the arrow in Fig. 1 and with the lower end of the latch 21 set against one of the pins 27, it will be seen that the draft or force in the draft link 8 will be transmitted by the engaged pin 27 to the latch 21, and the latter being pivotally mounted on the sliding frame 15 will lock the latter to the draft link 8 so that the power will be transmitted through the frame 14 to drag the scraper 2 along the surface.

Figure 3:
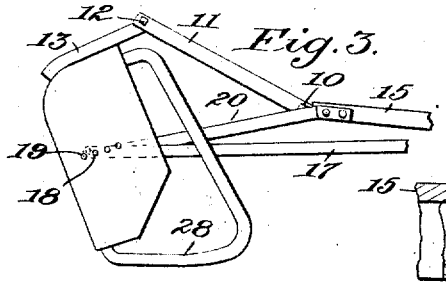
Fig. 3 is a side elevation showing the dumping position of the scraper.

The angle of the bottom of the scraper will be determined by the distance of one of the pins 27 engaged by the latch 21 from the link connection 12 at the back and top of the scraper. After the tractor with the scraper has been advanced a sufficient distance to secure the loading of the scraper, the operator then has but to pull on the lever 24 to disconnect the latch 21 whereupon the connection between the frame 14 and the draft link 8 being broken the scraper will tend to rock on its front edge and rise on side shoes 28, that are provided for that purpose, to the position shown in Fig. 3, this being accomplished by reason of the change of the point of pull from the pivots 18 in the sides of the scraper to the pivot 12 at the upper end of the bracket 13 to which the links 11 at the rear end of the draft member 8 are attached.

Having in this manner secured the dumping of the scraper it is only necessary for the operator to back up the tractor 6 with the result that the scraper will be turned downwardly on the shoes 28 to the horizontal position shown in Fig. 1, and when the body of the scraper has assumed the desired angular position it is locked at the same by the stopping of the reversing movement of the tractor after which it can be advanced and the pulling frame 14 automatically connected by the latch 21 to the draft link 8.

While the means for changing the position of the earth engaging element is shown in connection with a road scraper of the shovel type, and this is the preferred application of the invention, certain features thereof are useful for changing the position of other types of earth-working implements. The claims are therefore not to be considered as being limited to the particular form of implement shown, unless their terms are such as to require such limitation.

Various changes may be made, without departing from the spirit of my invention as claimed.

I claim:

1. The combination with a tractor having a draft device, of an earth scraper of the shovel type, and a setting and tripping draft connection between the tractor and said earth scraper, whereby when the tractor is advanced said connection interlocks at selective positions to determine the effective ground engaging angle of said earth scraper.

2. The combination with a tractor having a draft device, of an earth scraper of the shovel type; and a setting and tripping draft connection between the tractor and said earth scraper, whereby when the tractor is advanced said connection interlocks at selective positions to determine the effective ground engaging angle of the earth scraper and by which means the earth scraper can be moved to inoperative position while the tractor is still advancing and is attached to the earth scraper.

3. The combination with a tractor having a draft device, of an earth scraper of the shovel type; and a setting and tripping draft connection between the tractor and said earth scraper, said connection locking the earth scraper in operative position when the tractor is advanced and operative to adjustably interlock at a selected one of a plurality of positions when the tractor is backed up after said scraper has been moved to inoperative position.

4. An earth working machine having means for attachment to draft means, said attaching means including a draft link connected at its rear end to the back of the earth working machine; a sliding device mounted on the draft link and connected pivotally to the earth working machine; and means for locking the sliding device at selective positions to the draft link.

5. A connecting device attachable to an earth working implement and attachable to a tractive means; said connection comprising a main draft beam to be hitched at one end of the tractive means and to be pivotally connected at its other end to the implement; and an adjustable sliding member with means to lock it in selective positions on the draft beam; said member pivotally connectible to the implement at a point in advance of the connection thereto of the draft member or beam, whereby the attachment serves to secure the implement in an operative position when locked thereto and when the sliding member is disconnected the device is operative to shift the implement to another position.

6. An earth working machine having means for attachment to a draft device including a draft link connected at its rear end to the back of the earth working machine, a sliding device mounted on the draft link and connected pivotally with the earth working machine, a latch mounted on one of said parts and a plurality of pins or stops mounted on the other of said parts for locking the sliding device at selective positions to the draft link.

7. A connecting device attachable to an earth working implement and attachable to tractive means; said connection comprising a main draft beam to be hitched at one end to the tractive means and to be pivotally connected at its other end to the implement, stops on said beam, and an adjustable sliding member having a hand-operated latch for engagement with said stops to lock it in selective positions on the draft beam; said member pivotally connectible to the implement at a point in advance of the connection thereto of the draft member or beam.

In testimony whereof I have signed my name to this specification.

JOSEPH S. REYNOLDS.